(12) United States Patent
Aggarwal

(10) Patent No.: US 11,846,269 B2
(45) Date of Patent: Dec. 19, 2023

(54) DRAG CUM LIFT BASED WIND TURBINE SYSTEM HAVING ADJUSTABLE BLADES

(71) Applicant: Rakesh Aggarwal, New Delhi (IN)

(72) Inventor: Rakesh Aggarwal, New Delhi (IN)

( * ) Notice: Subject to any disclaimer, the term of this patent is extended or adjusted under 35 U.S.C. 154(b) by 0 days.

(21) Appl. No.: 17/795,146

(22) PCT Filed: Oct. 3, 2020

(86) PCT No.: PCT/IB2020/059302
§ 371 (c)(1),
(2) Date: Jul. 25, 2022

(87) PCT Pub. No.: WO2021/148859
PCT Pub. Date: Jul. 29, 2021

(65) Prior Publication Data
US 2023/0054090 A1 Feb. 23, 2023

(51) Int. Cl.
*F03D 3/06* (2006.01)
*F03D 3/02* (2006.01)
(Continued)

(52) U.S. Cl.
CPC .............. *F03D 3/06* (2013.01); *F03D 3/02* (2013.01); *F03D 7/06* (2013.01); *F03D 1/065* (2013.01); *F03D 1/0683* (2013.01); *F03D 3/062* (2013.01); *F03D 3/064* (2013.01); *F03D 3/065* (2013.01); *F03D 3/067* (2013.01); *F03D 7/0204* (2013.01);
(Continued)

(58) Field of Classification Search
CPC combination set(s) only.
See application file for complete search history.

(56) References Cited

U.S. PATENT DOCUMENTS

| 7,488,150 B2 | 2/2009 | Krippene |
| 8,618,682 B2 | 12/2013 | Syrovy |

(Continued)

FOREIGN PATENT DOCUMENTS

WO 2003076800 A2 9/2003

OTHER PUBLICATIONS

Dr. K.G.Upadhaya, Dr.M.M.Tripathi, Amit Verma, Rajeev Kumar, Design of Adjustable Blade Wind Turbine for Constant Generated Power, Power India International Conference (PIICON), 2014 6th IEEE, Dec. 2014, India.

(Continued)

*Primary Examiner* — Binh Q Tran
(74) *Attorney, Agent, or Firm* — Dickinson Wright PLLC

(57) ABSTRACT

Invention relates to renewable Wind energy combining drag and lift forces into usable torque, having adjustable blades panels with sub blades. Its unique feature is to convert reverse drag into usable lift and combine the two forces in to one cohesive force. The system comprises output drive rotor arranged on a tower base, with its rotating arms with blade panel assemblies mounted rotatably. Each blade panel assembly comprises an auxiliary rotary shaft having sub-blade panels pivotable at one or more pivot points with primary or secondary control arrangements for blocking and/or allowing wind to pass through the blade panels partially or fully. The system further includes sensors to collect control information, coupled to Main Control Unit (MCU) and secondary control arrangements, configured to provide one or more energy forms.

10 Claims, 5 Drawing Sheets

(51) Int. Cl.
*F03D 7/06* (2006.01)
*F03D 1/06* (2006.01)
*F03D 7/02* (2006.01)
*F03D 7/04* (2006.01)

(52) U.S. Cl.
CPC ............ *F03D 7/0208* (2013.01); *F03D 7/028* (2013.01); *F03D 7/0212* (2013.01); *F03D 7/0216* (2013.01); *F03D 7/04* (2013.01); *F03D 7/043* (2013.01); *F03D 7/044* (2013.01); *F03D 7/048* (2013.01); *F05B 2240/30* (2013.01)

(56) References Cited

U.S. PATENT DOCUMENTS

| | | | |
|---|---|---|---|
| 9,249,677 | B1 | 2/2016 | Somerville |
| 2008/0203731 | A1* | 8/2008 | Dulcetti Filho ........ F03D 3/064 290/55 |
| 2008/0304965 | A1* | 12/2008 | Syrovy ................... F03D 3/068 416/117 |
| 2013/0039761 | A1* | 2/2013 | Dulcetti Filho ........ F03D 3/068 416/3 |
| 2017/0051720 | A1* | 2/2017 | Grigg ....................... F03D 3/005 |
| 2018/0195494 | A1* | 7/2018 | Mobaraki ............... F03D 3/005 |
| 2021/0285417 | A1* | 9/2021 | Jacob ...................... F03D 3/061 |
| 2022/0003205 | A1* | 1/2022 | Jang ........................ F03D 3/005 |

OTHER PUBLICATIONS

Dr. Eng. Ali H. Almukhtar, Effect of drag on the performance for an efficient wind turbine blade design, SciVerse ScienceDirect, Energy Procedia 18 (2012) 404-415.

* cited by examiner

DRAG CUM LIFT BASED WIND TURBINE SYSTEM HAVING ADJUSTABLE BLADES

FIELD OF THE INVENTION

Embodiments of the present invention generally relate to renewable energy generation systems and devices. Particularly, present disclosure relates to a drag cum lift based wind turbine system having adjustable blades.

BACKGROUND OF THE INVENTION

The subject matter discussed in the background section should not be assumed to be prior art merely as a result of it being mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Renewable energy often referred to as clean energy has increasingly become one of the chief sources of energy across the world. With depleting non-renewable resources, increasing pollution, and ever-increasing requirements for electric power the world has now turned its attention to renewable energy to fulfil the energy demand and that too without harming the environment. Two most popular sources of renewable energy are solar energy and wind energy. Wind turbines and wind mills have been in existence since centuries and providing cheapest energy source in many parts of the world.

Although the basic platform configuration of windmills with three-bladed horizontal-axis upwind wind turbine on a monopole tower has not changed much. However, the windmill size has increased 6-7 times in terms of hub height, 6-8 times in terms of rotor diameter, and 30-50 times in terms of power rating. The size of wind turbines today rivals large-scale monuments and buildings while withstanding dynamic and complex loading throughout the turbine's lifetime. The majority of wind turbines consist of a turbine fitted with three blades mounted on a tower made from tubular steel. There are less common varieties with two blades, or with concrete or steel lattice towers. At 100 feet or more above the ground, the tower allows the turbine to take advantage of faster wind speeds found at higher altitudes.

Turbines catch the wind's energy with their propeller-like blades which act much like an airplane wing having area in contact with wind a small fraction of total area swept by the blades in circle. When the wind blows, a pocket of low-pressure air forms on one side of the blade. The low-pressure air pocket then pulls the blade toward it causing the rotor to turn at right angle to wind direction, this is called lift. The force of the lift is always less than the wind's total force applied on the front side of the blade, trying to push the blade in the direction of wind, which is called drag is around 300% or more. The partial conversion of drag in to lift causes the rotor to spin like a propeller. A series of gears increase the rotation of the rotor from about 18 revolutions a minute to roughly 1,500 or 1,800 revolutions per minute—a speed that allows the turbine's generator to produce AC electricity in accordance with local grid.

A streamlined enclosure houses key turbine components usually including the gears, rotor and generator that are found within a housing called the nacelle. Sitting atop the turbine tower, some nacelles are large enough for a helicopter to land on. Another established key component is the turbine's controller that regulates the rotor speeds from winds exceeding 55 mph to avoid damage by high winds. An anemometer continuously measures wind speed and transmits the data to the turbine's controller. A brake, also housed in the nacelle, stops the rotor mechanically, electrically, or hydraulically in emergencies.

The angle between the direction of the oncoming wind and the pitch of the blade with respect to the oncoming wind is called the "angle of attack". As this angle of attack becomes larger, more lift is created but as the angle becomes even larger, greater than about 20 degrees, the blade will begin to decrease lift. So, there is an ideal pitch angle of the rotor blade that generates optimum torque.

It's obvious to say that this propeller like wind turbine blade design converts only the lift energy of the wind into usable shaft power called torque. This is achieved by extracting the energy from the wind by slowing it down or decelerating the wind as it slips over the blades.

Hence, there exists a need for a drag cum lift-based wind turbine system having adjustable blades that offer more contact area of the blade, and function even at the low wind speeds as well as on high wind speeds beyond 200 km/h, with improved efficiency, cost effectiveness and easy to maintain design.

OBJECT OF THE INVENTION

An object of the invention is to provide a drag cum lift based wind turbine system having adjustable blades where drag and lift forces are additive by rotating the blade with the wind and not at right angle to improve efficiency.

Another object of the invention is to make drag force as main propellant and add lift force by dynamically changing blade's attack angle in response to its rotational position within each rotation.

Yet another object of the present invention is to provide a blade assembly that comprises sub-blade panels rotatable on their own axis and increasing its operating wind speed range from less than 5 Mtrs per second to beyond 80 Mtrs per second.

Yet another object of the present invention is to make the wind turbine less costly and easy to maintain.

SUMMARY OF THE INVENTION

According to a first aspect of the present invention, there is provided a drag cum lift based wind turbine system having adjustable blades. The system comprises one or more output drive rotors arranged on a base, each output rotor being connected with one or more arms with one or more primary control arrangements; and one or more blade panel assemblies rotatably connected with the one or more respective arms. Each blade panel assembly comprises an auxiliary rotary shaft rotatably extending from each of the one or more arms; and a mounting arrangement connected with the auxiliary rotary shaft via the one or more primary control arrangements, each mounting arrangement having one or more sub-blade panels pivotable at one or more pivot points of the mounting arrangement using one or more secondary control arrangements to allow the one or more sub-blade panels to rotate, thereby blocking and/or allowing wind to pass through the blade panels partially or fully. The system further includes one or more sensors to collect control information, coupled with one or more of the auxiliary rotary shaft, the mounting arrangement, the one or more sub-blade panels and the one or more output drive rotors; a Main Control Unit (MCU) may have a processing module connected with one or more sensors, the one or more primary control arrangements and the one or more secondary control arrangements; and an output arrangement configured to convert rotational torque of the one or more output drive rotors to one or more energy forms.

In accordance with an embodiment of the present invention, the MCU via the processing module is configured to dynamically determine the wind direction, the wind speed, the speed of rotation of the one or more output drive rotors, the individual angular position of the one or more arms with respect to a maximum thrust point and the force on the each mounting arrangement using the one or more sensors; and adjust an attack angle of each of the mounting arrangements with respect to the respective one or more arms dynamically during each rotation by rotating the respective auxiliary rotary shaft using the primary control arrangements, to optimise a forward drag and/or lift force and reduce a reverse drag during respective part rotation of each blade assembly against the wind.

In accordance with an embodiment of the present invention, the MCU via the processing module is further configured to adjust opening of the one or more sub blade panels using the one or more secondary control arrangements to reduce reverse drag, regulate as well as smoothen torque during gusty wind and protect the system against speeds exceeding design limits, ensuring reliable and optimum capacity output without interruptions while preventing any damage to the system.

In accordance with an embodiment of the present invention, the one or more output drive rotors may be arranged horizontally, vertically or at angle there between on the base in a series or parallel arrangement.

In accordance with an embodiment of the present invention, the one or more arms extend radially or tangentially from either ends or a section between the either ends of each of the one or more output drive rotors or a combination thereof.

In accordance with an embodiment of the present invention, the one or more sub-blade panels are configured to open vertically or horizontally or at an angle, withthe respective mounting arrangement of the one or more blade panel assemblies.

In accordance with an embodiment of the present invention, the one or more sub-blade panels are made of a material selected from a metal, non-metal, alloy, polymer, fibre, glass, ceramic, wood or a combination thereof.

In accordance with an embodiment of the present invention, the one or more primary control arrangements and the secondary control arrangements are selected from but not limited to one or more of cam & follower arrangements, servo motors, belt & pulley arrangements, a chain & sprocket mechanism, gearing arrangements, linear & rotary actuator, lever mechanisms, centrifuge, hydraulics, pneumatic control, numerical control, stepper motors, electromagnetic motors, electromagnets, screw actuators or a combination thereof.

In accordance with an embodiment of the present invention, the one or more sensors include but not limited to direction sensor, speed sensor, accelerometer, gyro sensor, magnetometer, orientation sensor, groove reader, protrusion reader, optical reader, pressure sensor, radiation sensor, punched disc reader, magnetic sensor, hall effect sensors, gravity switch, tilt sensor, encoder, position sensor, tachometer, motion sensor or a combination thereof.

According to a second aspect of the present invention, there is provided a blade panel assembly for a wind turbine system. The mounting arrangement and panel assembly comprises an auxiliary rotary shaft or pivoting arrangements extending from each of the one or more arms of the wind turbine system mounting arrangement connected via the one or more primary control arrangements. Each mounting arrangement comprises one or more sub-blade panels pivotable at one or more pivot points on the mounting arrangement using one or more secondary control arrangements to allow the one or more sub-blade panels to rotate individually or collectively, thereby blocking and/or allowing wind to pass through the blade panels partially or fully.

BRIEF DESCRIPTION OF THE DRAWINGS

So that the manner in which the above recited features of the present invention can be understood in detail, the description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, the invention may admit to other equally effective embodiments.

These and other features, benefits and advantages of the present invention will become apparent by reference to the following text figure, with like reference numbers referring to like structures across the views, wherein.

DETAILED DESCRIPTION OF THE DRAWINGS

Figure 1A:
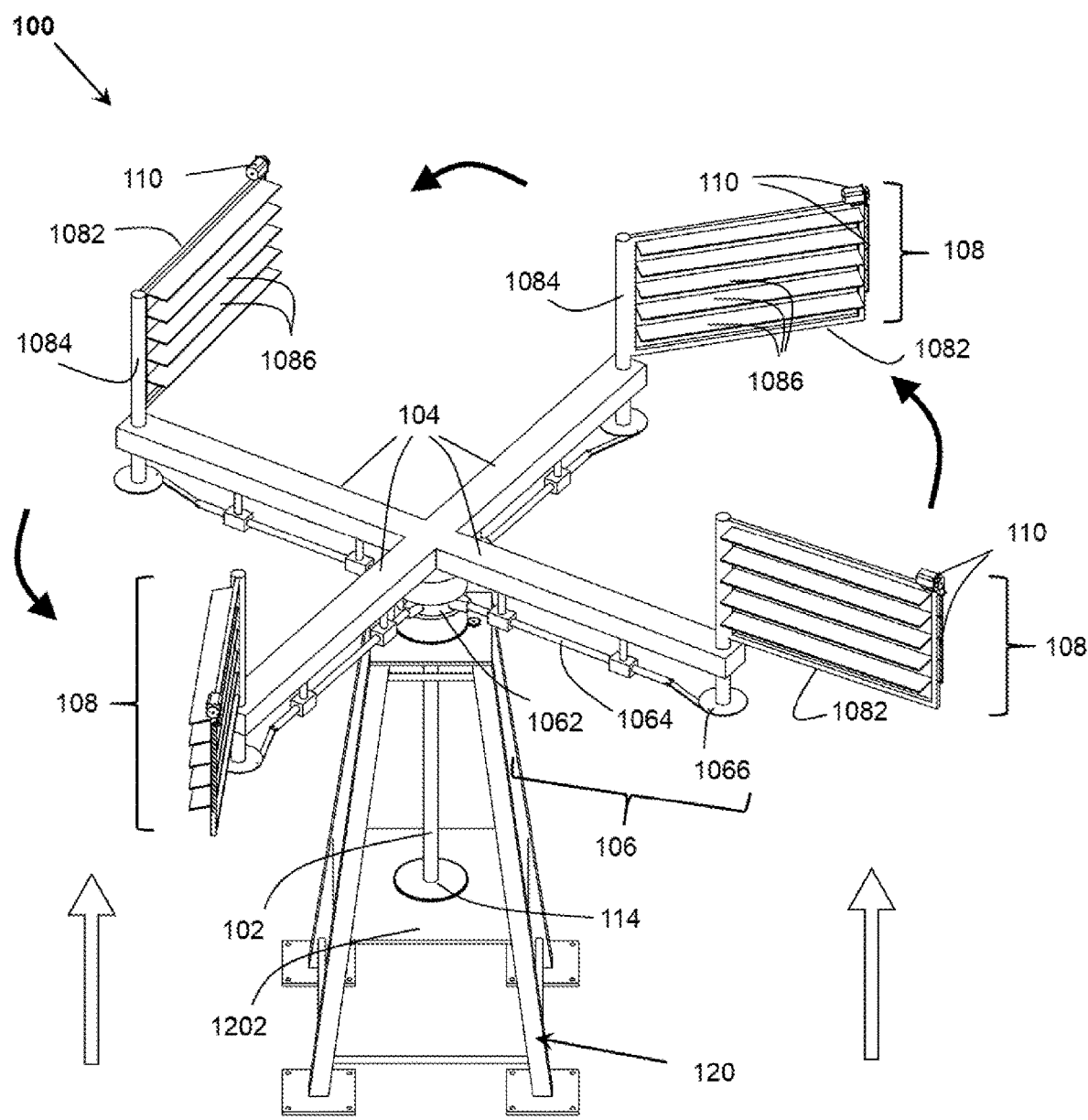
FIG. 1A illustrates an isometric view of a drag cum lift based wind turbine system in a vertical axis arrangement, in accordance with an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude them and other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

The present invention is described hereinafter by various embodiments with reference to the accompanying drawings, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention. Furthermore, the terminology and phraseology used herein is solely used for descriptive purposes and should not be construed as limiting in scope.

The present invention provides a drag cum lift based wind turbine system that has multiple adjustable blade panel assemblies and each blade panel assembly itself comprises of multiple controllable (rotatable) sub-blade panels. The present invention with its novel and inventive arrangement, is able to independently change incident angle of each blade panel assembly continuously during each rotation, in order to optimise forward drag or reduce a reverse drag and generate some lift during part rotation. The arrangement is configured in a way that the wind blows tangentially to the rotation of main rotor and not axially. The main rotor or rotors may be placed vertically, horizontally or at any angle there between, each with one or more blade panel assemblies fixed on respective arms connected to rotor anywhere on rotor length. These auxiliary shafts of blade panel assemblies are controlled by a main control unit and control arrangements (such as CAM arrangement, actuators etc.) to adjust the incident angle of blade panels with respect to wind direction, changing continuously during each rotation cycle. Output arrangements are provided to harness energy from the rotation of the turbine and the main rotor(s).

Further, as each blade panel assembly comprises moveable or controllable sub-blade panels, so in normal wind/operational condition the sub-blade panels are in a closed position to block the air (offering maximum area for the wind to strike) and generate maximum forward drag and lift force. However, as the wind speeds start to exceed beyond certain predetermined limits, then the sub blade panels of the each blade panel assembly may be independently opened (partially or fully), to allow excessive air to pass through the blade panel, partially or fully. This independent control of sub blade panels helps in keeping forward torque constant, even with more than 30 times wind velocity change. This design feature eliminates the need of brakes to control rotation in excessive wind speeds. The method permits transfer of collected rotational force for further conversion to any other form of energy as per needs.

The present invention will now be described with reference to the drawings covering various embodiment of the present invention.

FIG. 1A illustrates an isometric view of a drag-based wind turbine system (100) in a vertical axis arrangement, in accordance with an embodiment of the present invention. As shown in FIG. 1A, the drag-based wind turbine system (100) (hereinafter referred to as "the system (100)") has been arranged in a vertical axis-arrangement. However, it will be appreciated by a skilled addressee that the system (100) of the present invention may be arranged in the vertical axis, horizontal axis, or at any there between, without departing from the scope of the present invention. Other kind of arrangements have also been discussed in other embodiments of the present invention that are explained later in the description. For better explanation and clarity in understanding, a front view and top view of the system (100) of FIG. 1A has also been shown in FIG. 1B-1C, respectively.

As shown in FIG. 1A, the system (100) comprises one or more output drive rotors (102) arranged on a base structure (120). The base structure (120) may be understood as a structure that allows the system (100) to attain desired height and also house the components of the system (100). The height may range from 1 meter to a few hundred meters, depending upon the type of the application. So, in that sense, the base (120) may be, but not limited to, a tower etc. having one or more legs (1204) and one or more horizontal/vertical platforms (1202) to accommodate components of the system (100) (as marked in FIGS. 1A and 1B). Furthermore, there can be multiple base structures (120) if more than one wind turbines are used in a single system (100). The one or more output drive rotors (102) may be arranged on the base structure (120) vertically or horizontally or at any angle there between in a series or parallel arrangement, depending upon type of arrangement (horizontal, vertical etc.) used for system (100). The one or more output drive rotors (102) act as the hub for entire rotating turbine and means to collect and transfer the energy produced by the system (100), to other energy transferring gadgets including, but not limited to, electrical, Mechanical, hydraulic, heat etc.

Figure 1B:
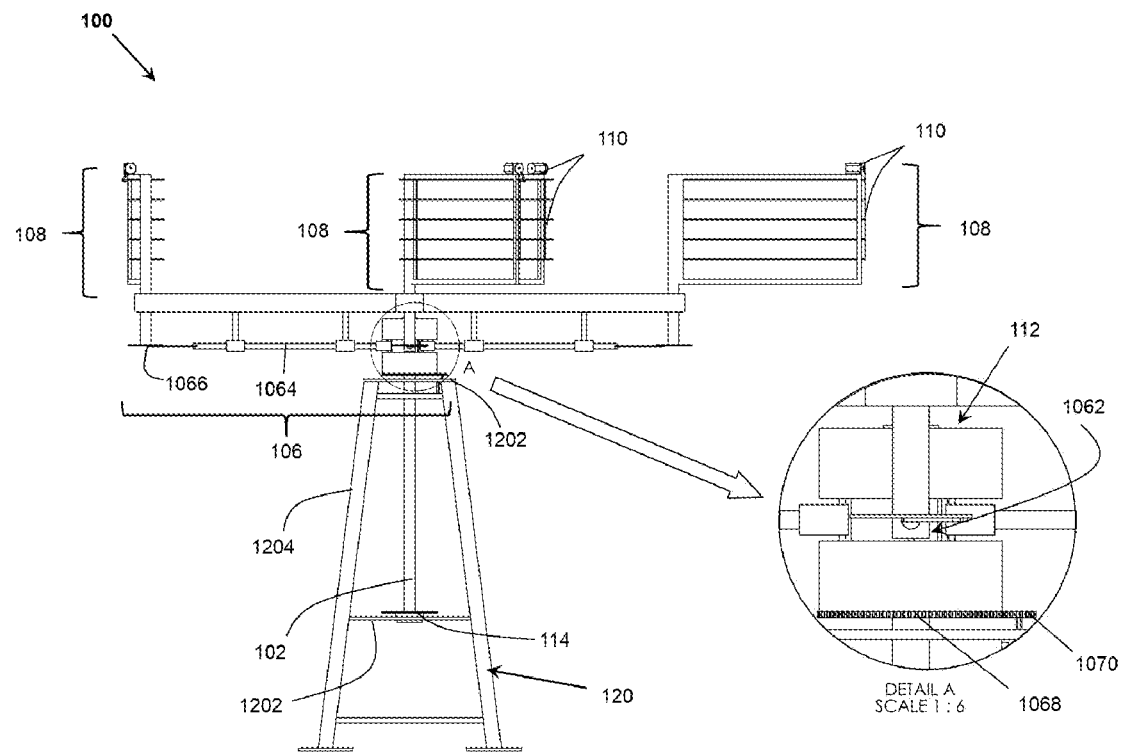
FIG. 1B-1C illustrate a front view and top view of the drag cum lift based wind turbine system of FIG. 1A, respectively, in accordance with an embodiment of the present invention.
Figure 1C:
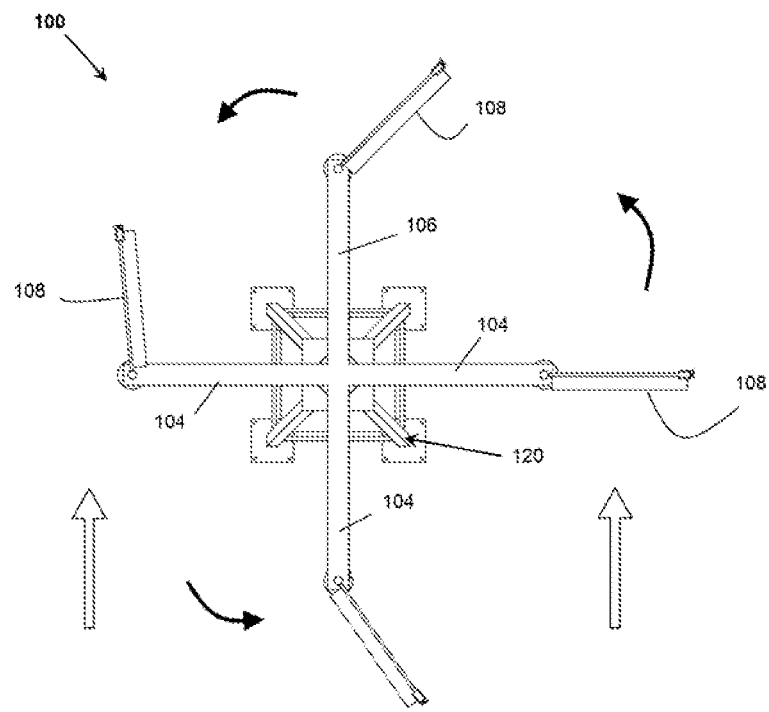

To keep the explanation simple, in the embodiment shown in FIG. 1A-1C, only one output drive rotor (102) has been shown to be arranged vertically on the base. Further, the one or more output drive rotors (102) are connected with one or more arms (104). The one or more arm structure may extend radially or tangentially from either or both ends or a section between the either ends of each of the one or more output drive rotors (102). For example, four arms (104) extend radially (90 degree apart) from a top end of the output drive rotor (102) shown in the FIG. 1A. The one or more arms (104) are connected with the one or more output drive rotors (102) using primary control arrangements (106). The term "primary control arrangements (106)" is envisaged to include multiple types of mechanisms and combinations of the multiple type of mechanisms/arrangements.

In that sense, the one or more primary control arrangements (106) and the secondary control arrangements (110) are selected from, but not limited to, one or more of cam & follower arrangements, servo motors, belt & pulley arrangements, a chain & sprocket mechanism, linear & rotary actuator (1066), gearing arrangement, lever mechanisms, centrifuge, hydraulics, pneumatic control, numerical control, stepper motors, electromagnetic motors, electromagnets, screw actuators, groove readers, digital and analog controls or a combination thereof. For example: embodiment shown in FIGS. 1A-1B illustrate a use of cam and follower in the form of groove reader (1062) mechanism, linear actuators, control rods (1064), rotary actuator (1066), linear bearings, gearing arrangement etc. as primary control arrangements (106).

Figure 2A:
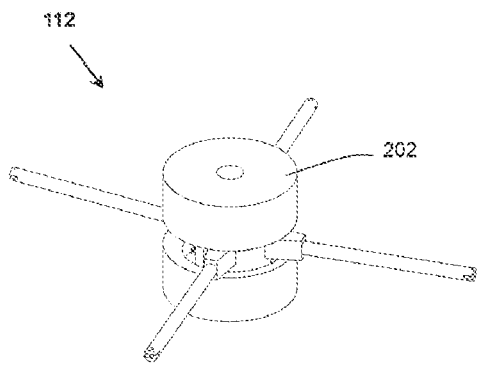
FIG. 2A-2C illustrate cam and follower arrangement in form of a groove reader acting as a Main Control Unit (MCU) in the system, in accordance with an embodiment of the present invention.
Figure 2B:
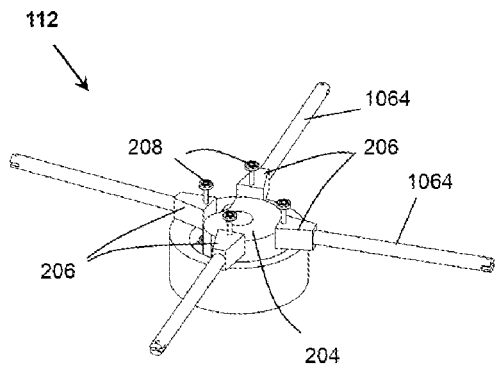
Figure 2C:
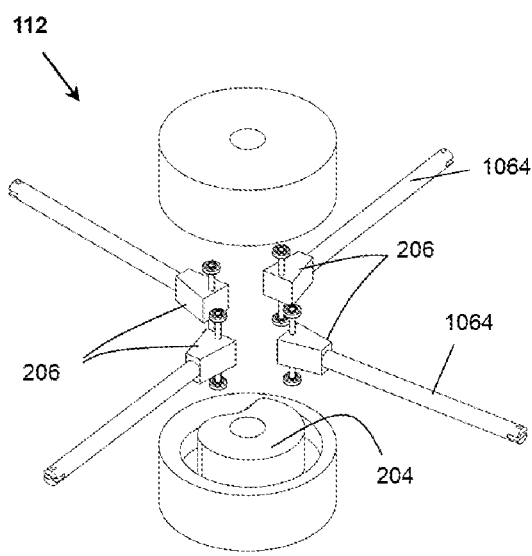

The cam and follower (1062) mechanism used in embodiment of FIG. 1A-1C has been shown in more detail in FIG. 2A-2C. FIGS. 2A-2C illustrate a cam and follower arrangement in form of a groove reader acting as a Main Control Unit (MCU) (112) of the present invention. In FIG. 2A, the cam and follower (1062) mechanism is shown to be disposed in the MCU (112). The FIGS. 2B & 2C illustrate an open-top and exploded view of the same respectively. As can be seen from the FIGS. 2A-2C that the MCU (112) includes a housing (202). Additionally, a cam (204) is having a predefined width groove around it, having a predetermined shape is disposed in the housing (202) and is surrounded by the four followers (206) connected with the control rods (1064) of each of the linear actuator along each of the four arms (104). The followers (206) are each fitted with two freely rotating wheels/bearings (208) of suitable size to fit in to cam groove configured to move over the contour of the cam (204). The shape of the groove has been pre-programmed to optimise each blade panel assembly's attack angle, during 360° one complete rotation assuming predefined wind direction say North. When this complete groove assembly is rotated by 90° clock wise, its optimum wind direction for all the blades will change by 90° from existing North direction to East direction.

Rotation of this complete groove assembly in the housing (202) is achieved by gear assembly comprising a smaller drive gear (1070), meshed with the direction control gear (1068) driven by a motor (not clearly visible) under control of Main Control Unit (MCU) (112) ensuring the wind turbine system (100) optimally active in all directions of wind. The drive gear (1070) helps turn the direction control gear (1068) with housing (202) attached to it, in the desired orientation depending upon inputs from the wind direction sensor. Additionally, one or more auxiliary components (208) such as (bearings, rivets, small wheels, rods etc.) for securing the components in place and enable smooth relative motion may also be provided.

It is to be noted that all the components and linkages of the primary control arrangements (106) mentioned above or shown in FIG. 1A-1C and FIG. 2A-2C are only exemplary. These illustrate that the primary control arrangements (106) can be purely mechanical and yet pre-configurable for automatic operation. However, the above mentioned components may simply be replaced by other electrical components as listed in the primary control arrangements (106) above. The present invention may simply employ electric motors instead of cam-follower mechanism (1062) or linear and rotary actuators (1066). Additionally, the connection between the one or more output drive rotors (102) and one or more arms (104) (or any moving components) may involve electromagnets (for example, in the housing (202)) and utilise magnetic levitation to optimise (eliminate during low speed wind & increase during high speed wind) the friction between moving parts. In this way, the number of components (and moving components) required may be reduced.

Returning to FIG. 1A, the system (100) further comprises one or more blade panel assemblies (108) rotatably connected with the one or more respective arms (104). As shown in FIGS. 1A-1C, each arm (104) is connected with one blade assembly (108) at a far end of the respective arm (104). As can be seen from the FIG. 1, each blade panel assembly (108) comprises an auxiliary rotary shaft (1084) rotatably mounted on each of the one or more arms (104), connected via the one or more primary control arrangements (106). The primary control arrangements (106) rotate the auxiliary rotary shaft (1084) and thereby changing attack angle of each blade panel assembly (108). Also, there is provided a mounting arrangement (1082) connected with the auxiliary rotary shaft (1084). The mounting arrangement may include one or more of a frame, connection means, fitting means etc.

In the example shown, the mounting arrangement is shown to include a blade frame that may have square, rectangular or any polygonal shape. In addition, each mounting arrangement (1082) (which is a blade frame in this example) has one or more sub-blade panels (1086) pivotable at one or more pivot points of the mounting arrangement (1082). This is made possible by the one or more secondary control arrangements (110) connected with the mounting arrangement (1082). This allows the one or more sub-blade panels (1086) to rotate (open and close), thereby blocking and/or allowing wind to pass through the blade panels partially or fully. In another embodiment, the mounting arrangement (1082) may include rotatably fixing/mounting the pivotable one or more sub blade panels (1086) directly on the auxiliary rotary shaft (1084) via a connection means (without requiring any frame).

Figure 3A:
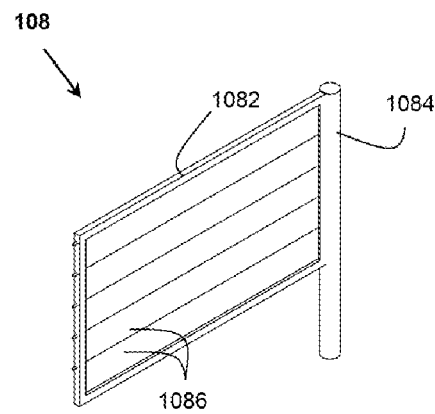
FIG. 3A-3C illustrate a blade panel assembly with (a) closed, (b) partially opened/closed and (c) open sub blade panels, in accordance with an embodiment of the present invention.
Figure 3B:
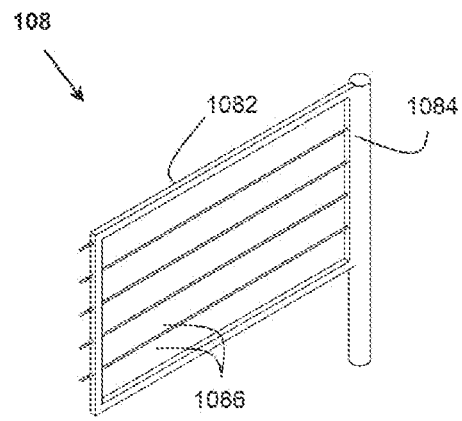
Figure 3C:
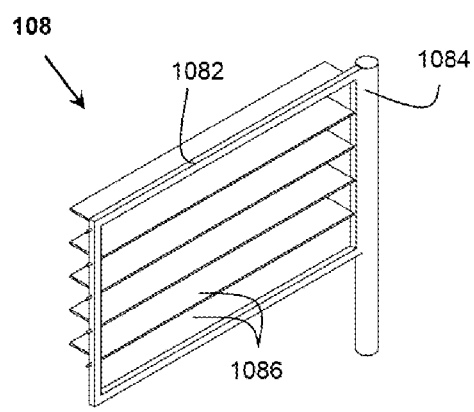

FIG. 3A-3C illustrates the blade panel assembly (108) with (a) closed, (b) partially opened/closed and (c) open sub blade panels (1086). The FIGS. 1A-1C and 3A-3C illustrate an embodiment where the sub-blade panels (1086) are pivoted horizontally and are divided as one in each row. But in other embodiments, the sub-blade panels (1086) may pivot vertically or at an angle and may be divided a one in each column. In yet another embodiment, there may be multiple sub-blade panels (1086) in each row and column (like a chessboard), wherein each sub-blade panel or groups of sub-blade panels (1086) operate independently. Besides, the one or more sub-blade panels (1086) are made of a material selected from, but not limited to, a metal, non-metal, alloy, polymer, fibre, glass, ceramic, wood or a combination thereof. The blade panel assembly (108) is novel and inventive in itself, as it may also be used to modify existing wind turbines providing improvements.

As previously mentioned, the secondary control arrangements (110) are configured to facilitate the pivoting motion of the one or more sub-blade panels (1086). In that sense, the secondary control arrangements (110) are selected from, but not limited to, one or more of cam & follower arrangements, servo motors, belt & pulley arrangements, a chain & sprocket mechanism, gearing arrangements, linear & rotary actuator (1066), lever mechanisms, centrifuge, hydraulics, pneumatic control, numerical control, stepper motors, electromagnetic motors, electromagnets, screw actuators, groove readers, digital and analog controls or a combination thereof.

In the exemplary embodiment shown in FIGS. 1A-1C, the secondary control arrangement includes a control rod, motor (110), rotary actuator and levers mounted on each mounting arrangement (1082). The control rod is linked with each of the one or more sub-blade panels (1086) and the servo motor is connected with the control rod. The servo motor moves the control rod and the control rod in turn moves each of the one or more sub-blade panels (1086) to completely open, partially open/close or completely close them.

Furthermore, the system (100) comprises one or more sensors (not shown) coupled with one or more of the auxiliary rotary shaft (1084), the mounting arrangement (1082), the one or more sub-blade panels (1086) and the one or more output drive rotors (102). The one or more sensors include, but not limited to, direction sensor, speed sensor, accelerometer, gyro sensor, magnetometer, orientation sensor, groove reader, protrusion reader, optical reader, pressure sensor, radiation sensor, punched disc reader, magnetic sensor, anemometer, hall effect sensors or a combination thereof. These sensors may be disposed wherever they are required in the system (100), depending upon where the system (100) is being implemented.

Additionally, as previously mentioned during the primary control arrangements (106) that the system (100) also includes the Main Control Unit (MCU (112)). In accordance with an embodiment of the present invention, the MCU (112) is generally disposed between one or more arm structures (104) and the one or more output drive rotors (102). In other embodiments involving multiple output drive rotors (102) and more than one MCUs (112), there may be respective MCU (112) along with each output drive rotor (102) (and its connected components). Apart from the primary control arrangements (106), the MCU (112) may further include or is connected with a processing module (not shown). For embodiments similar to the one shown in FIG. 1A, where there is only one output drive rotor, the processing module may be disposed in the housing (202) along with the Cam and follower (1062). In other embodiments involving multiple output drive rotors (102) and more than one MCUs (112), there may be a processing module placed in each MCU (112) or there may be a single centrally-placed processing module for the whole system. The MCU (112) having the processing module is connected with one or more sensors, the one or more primary control arrangements (106) and the one or more secondary control arrangements (110). The processing module is capable of receiving inputs from the one or more sensors, input devices or can be externally connected through LAN/WAN, internet etc and is also capable of providing control commands to the one or more primary control arrangements (106) and the one or more secondary control arrangements (110), and direction control arrangements, based on the received inputs.

The processing module (not shown) may include computing capabilities such as a memory unit configured to store machine readable instructions. The machine-readable instructions may be loaded into the memory unit from a non-transitory machine-readable medium, such as, but not limited to, CD-ROMs, DVD-ROMs and Flash Drives. Alternately, the machine-readable instructions may be loaded in a form of a computer into the memory unit. The memory unit in that manner may be selected from a group comprising EPROM, EEPROM, Flash memory and others. Further, the processing module includes a processor operably connected with the memory unit. In various embodiments, the processor may be, but not limited to an ARM based or multicore based processor in the form of field-programmable gate array (FPGA), a general-purpose processor and an application specific integrated circuit (ASIC).

In another embodiment, the processing module may be a microcontroller. The microcontroller may include one or more CPUs (processor cores) along with memory and programmable input/output peripherals. Program memory in the form of ferroelectric RAM, NOR flash or OTP ROM is also often included on the chip, as well as a small amount of RAM. In yet another embodiment, the processing module is a microprocessor. The microprocessor may be a multipurpose, clock driven, register based, digital integrated circuit that accepts binary data as input, processes it according to instructions stored in its memory and provides results as output. The microprocessor may contain both combinational logic and sequential digital logic and may act like a SBC. In yet another embodiment processing module may be remote connected external interface with control functions, processing loaded from external networks.

Further, the system (100) comprises an output arrangement (114) connected with the one or more output drive rotors (102) as shown in FIG. 1A-1B. the output arrangement (114) may be positioned at one or more platforms (1202) on the base. The output arrangement (114) is configured to convert rotational torque of the one or more output drive rotors (102) to one or more energy forms. The energy form may be electrical, mechanical etc., depending upon the application. In that sense, the one or more output arrangement (114) may include generators (for generating electrical energy), or for generating mechanical energy gears, belts, chains, pumps etc. the output arrangement (114) may also include fabrication accessories and fixing hardware and different kinds of bearing and friction reduction accessories, ratio converters (for increasing/decreasing the rotations from rotors as per the requirement) and direction converters using gears and belts or other means. To simply, the output arrangement (114) is envisaged to comprise all the infrastructure including auxiliary equipment for energy conversion or transfer of energy from one point to another within the system (100), within a site or beyond.

The method of working for the embodiment (vertical axis) of the drag-based wind turbine system (100) as shown in FIG. 1A-1C:

As already mentioned above that the present invention is capable of harnessing maximum wind energy from wind speeds ranging from a few mile per hour to hundreds of miles per hour, without any damages to its structure (even in cyclonic storms). This is made possible using two unique innovative features of the present invention i.e.
(1) blade panel assemblies (108) that individually rotate on its own axis dynamically during each rotation of rotor depending upon its angular position to optimise forward drag & lift forces while reduce reverse drag;
(2) Pivotable sub-blade panels (1086) of the blade panel assembly (108), that can pivot (open/close) to alter its contact area with the wind, and allow excess wind to pass through the panel assembly and prevent any damage during high speed winds.

The method of operation using the above mentioned features will now be described in detail. Referring to embodiments of FIG. 1A, it is assumed that wind is flowing in a forward direction (represented by white arrows outlined in black). There are four arms (104), each connected with one blade panel assembly (108) (so 4 blade panel assemblies (108)). The auxiliary rotary shafts (1084) of the blade panel assemblies (108) are supported by the respective arm structure (104) and controlled via the primary control arrangements (106). Therefore, the each blade panel assembly (108) is configured to rotate, but not limited to, 0-270 degrees, about the auxiliary rotary shaft (1084). However, in case, a motor is used as the primary control arrangement (106) between the respective arm structure (104) and the auxiliary rotary shaft (1084), then 360 degree rotation of the blade panel assembly (108) is also possible.

Even before the start of the operation of the present system (100) it is obvious to understand that certain conditions such as the wind is already flowing, the blade panel assemblies (108) may or may not be rotating due to the flowing wind, there would be a certain force being exerted on each blade panel assembly (108), the four arms (104) would be at a certain angular position and so on. Therefore, it is first required to determine these parameters. So, the processing module with the help of one or more sensors dynamically determine, but not limited to, the wind direction, the wind speed, the speed of rotation of the one or more output drive rotors (102), the individual angular position of the one or more arms and the force on the each blade frame (1082) using the one or more sensors.

Further, depending on the wind direction, direction of rotation required for application and the force on each blade panel assembly (108), the processing module using the one or more sensors, is configured to determine a maximum thrust point on the system (100) i.e. max. force point that would rotate the system (100) in desired direction.

For example, as shown in FIG. 10 (top view of system (100)), the desired rotation is anticlockwise (as shown by thick black arrows), the maximum drag force is on the blade panel assembly (108) on the right (as shown in diagram). drag force on the right most blade panel assembly (108) rotate the system (100) in the anti-clockwise direction with the wind. For maximising the forward thrust while minimising the reverse drag, on other 3 panels their attack angle is continuously changed to optimum position by the MCU (112). Continuing in FIG. 10, the blade panel assembly (108) on the left most position is most likely to experience reverse drag in moving against wind and pose a problem for anticlockwise rotation, so its contact area with wind can be minimised by orienting the left blade panel assembly (108) parallel to the wind direction or slightly inwards/outwards to generate some possible forward lift. Similarly, the blade panel assemblies (108) at the front and back (as shown on bottom and top of FIG. 10 respectively) are oriented in a way to generate forward drag and/or lift to add torque from the respective arm (104) in anti-clockwise direction (& not the other way). Point to note is that these two blades are generating lift as well as drag and both these forces are additive despite lift being at rightangle to wind direction but is synchronous with anticlockwise rotation. All the above mentioned parameters are dynamically determined by the MCU (112) (having the processing module) with the help of one or more sensors. Additionally, it is to be noted that the term "dynamically determine" is used to signify that all the above parameters are being continuously determined throughout each rotation and not just one time. This gives better control over the system (100) to achieve desired results.

The MCU (112) is configured to adjust an attack angle of each of the mounting arrangements (1082) dynamically during each rotation and repeat the process with each rotation. So, as shown in FIG. 10, the each of the four blade panel assemblies (108) keep on progressively exchanging their positions with optimised attack angle by rotating about their respective auxiliary rotary shaft (1086) using the primary control arrangements (106) under control of MCU (112) to achieve the desired orientation to optimise the forward torque. The positions of the four blade panel assemblies (108) shown in FIG. 1C are symptomatic and for example, when the arms (104) rotates 90 degrees anti clockwise, the blade panel assembly (108) on the right moves to position (top most as shown in FIG. 10), the back one moves to left, left one moves to front (bottom as shown in FIG. 10) and front/bottom one moves to the right and there are n numbers of other intermediate positions within the 360 degrees turning and panels repeat these positions in turn under control of (various types) of MCU's.

Point to note is when the blade panel assembly (108) on the left (in FIG. 10) moves to front (i.e. bottom position), it will rotate and change its attack angle by approx. 120 degrees±50 degrees to move from inward orientation to outward orientation as was held by the blade panel previously at the front. This sudden rotation happens at a pre-programmed rotational position where its reverse thrust generation is minimum and for shortest duration. The Main Control Unit (MCU (112)) facilitates the above mentioned functionalities using the primary control arrangements (106) which could be a simple groove reader as shown in FIG. 2B or complex electronic controller with programming (not shown).

In the exemplary embodiment shown, the primary control arrangements (106) include the cam-follower in form of groove reader(1062), control rods (1064), linear actuators, rotary actuator (1066) etc. Referring to FIGS. 2B & 2C, it can be seen that the contour of the cam is accompanied with a groove slowly moving away from centre during most of the rotation and in very small portion of rotation it suddenly moves inward and completes the round. Here FIG. 2B depicts contour position for wind direction from West to East and 2C from North to South, where as the FIG. 1A-C is showing blade assembly positions for wind direction South to North. As already told, the followers (206) revolve around the contour of the cam (204) in the groove around it & are further attached to the control rod (1064). The movement of panels and arm forces the followers (206) to move in groove and the shape of groove causing the back and forth (linear motion) in control rod (1064) which forces blade panel assembly to optimise the attack angle of panels through linear and rotary actuators (1066).

It is to be noted that the different portions of the contour of the cam (204) are responsible for causing rotations of the blade panel assembly (108). For example: the sudden dipping portion may cause a big rotation of the blade panel assembly (108), like the around 120 degree±50 degrees rotation required by the left most blade panel assembly (108) before it reaches position of bottom most blade. So, the absolute positioning of the cam (204) plays a huge role with respect to wind direction. Let's assume if the wind direction was opposite than the dipping position of the cam profile would be required on the opposite side like FIG. 2B as desired orientations for each blade panel assembly (108) will change at that position by 180 degrees. So, after change in the wind direction is sensed/determined, the MCU (112) rotates the cam assembly (202) in the desired direction, using the drive gear (1070) and the control gear (1068) shown in FIG. 1B, driven by a small motor (not fully visible in drawing).

It is to be noted that the above mentioned components and their method causing desired rotation of the one or more blade panel assemblies (108), is an example of mechanical primary control arrangements (106). This is to say that using the above mentioned components and method, a skilled addressee can achieve automatic or semi-automatic dynamic rotation mechanism of the one or more blade panel assemblies (108). However, the abovementioned mechanical means can be replaced by electrical, electronic, hydraulic, pneumatic components such as motors (like stepper/servo motors, pistons etc.) to easily reduce the number of components used, and still perform the dynamic attack angle change mechanism. Apart from these, other means mentioned in the list of the primary/secondary control arrangements (106) may also be used without departing from the scope of the present invention.

Additionally, note that the term "optimise" used herein the specification is envisaged to cover both the increase and decrease the forward drag & lift force, because in some whether conditions it may be desirable to reduce the forward drag. So, the present invention is capable of doing that as well.

In accordance with an embodiment of the present invention, there may be scenario such as a storm etc., where wind speed exceeds the overall design targets of the wind turbine system (100). For example: 50 meters/second wind speed is considered way too high for any existing wind turbine to generate torque. So, in such a scenario, the present invention offers a unique ability to let the dangerously high speed wind pass through the blade panel assembly (108) by suitable opening of all sub blades allowing wind to pass through, instead of striking it. This ability allows the present invention to not just avoid damage but also keep generating energy even in such harsh environmental conditions.

This is achieved because each blade panel assembly (108) of the present invention is itself made of the pivotable one or more sub-blade panels (1086) (refer FIG. 3). Continuing form the example of FIG. 1A, when the wind speed exceeds beyond a predetermined limit (as sensed by the system (100)), the MCU (112) via the processing module is further configured to adjust opening of the one or more sub blade panels using the one or more secondary control arrangements (110). This allows the wind to pass through blade frame (1082) (once fully open on blade frame (1082) will be visible) without any restrictions. The secondary control arrangement (110) not only can reduces reverse drag, but also regulate as well as smoothen torque during gusty winds and protect the system (100) from abnormal speeds. Apart from this, it ensures that the reliable and optimum capacity output is produced with very large variations in wind speed, without interruptions while preventing any damage to the system (100).

The ability of the one or more sub-blade panels (1086) to not only open or close but also partially open, allows the present invention to be used for multiple scenarios apart from high speed winds. This allows the present invention to withstand gusty winds and still produce a constant output. Like, in case of gusts where the wind speed increases with gush of wind for a few seconds irregularly. This variation is generally noticed to be within 20% increase/decrease in wind speed. This 20% excessive wind force can cause the turbine systems to be overloaded by more than 170% during these excursions. Though for small durations, this will create ripples in generated electricity and if persistent for longer periods it may deteriorate electrical generation equipment or damage them permanently.

As the present invented wind turbine system (100) is capable of starting generation at lower wind speeds around 3 meters per second or less, it will reach quickly to its rated full capacity with medium wind speeds between 10 to 20 meters per second. In good wind areas winds can flow at beyond the 20 Meters per second speed and up to 30 to 40 meters per second is quite normal. In the present system (100), the one or more sub blade panels can open partially to adjust the output to remain optimum constant. The present invention can therefore control the one or more sub blades to generate constant output beyond its designed optimum full load wind speeds up to, but not limited to, 80 meters per second or more. This design can maintain and control the output torque from the turbine system (100) to remain at design max, with wind speed variations up to ten times of the optimum speed.

In accordance with another embodiment of the present invention, the present system (100) may also be implemented as a horizontal axis drag-based wind turbine system (100). This embodiment has been shown in FIGS. 4A and 4B. This embodiment is meant to cover broader aspects that were talked about in the FIG. 1A-1C but not illustrated such as horizontal axis (or angular) orientation, multiple output drive rotors (102), multiple arms structures on both ends of the output drive rotors (102), central or respective MCUs (112) etc. All the components & working principles used in this embodiment are same, those of vertical axis embodiment of FIG. 1A, but only the number of components and design are different.

Figure 4A:
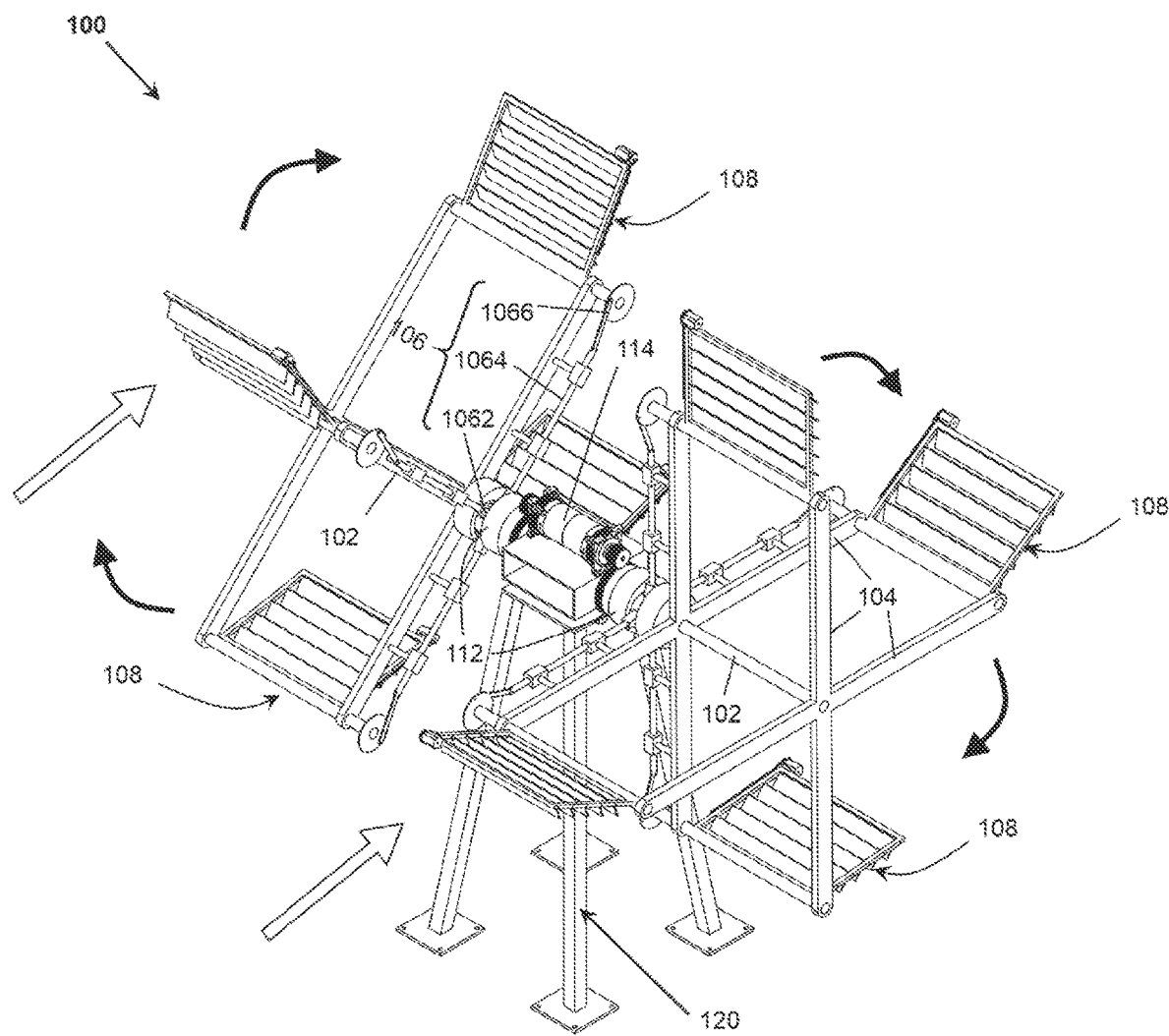
FIG. 4A illustrates an isometric view of the drag cum lift based wind turbine system in a horizontal axis arrangement, in accordance with an embodiment of the present invention.

As shown in FIG. 4A, there is a horizontal axis drag based wind turbine system (100) mounted on the base structure (120). As previously clarified, the base structure (120) may be, but not limited to, a tower, pillar etc. having one or more legs (1204) and having one or more platforms (1202) to accommodate components of the system (100). In his embodiment, the output arrangement (114) is arranged on a top of the base structure (120). The embodiment illustrates one or more output drive rotors (102) (say, two, in a series arrangement as shown in FIG. 4A), each connected with the output arrangement (114) at either side via the respective MCU (112) and the primary control arrangements (106), such as gears, shafts, pulley-belt, chain-sprocket etc. for transferring the rotational energy from the one or more output drive rotors (102) to the output arrangement (114) (Generator in this case). The processing module may be centrally placed or placed in respective MCUs (112). Further, one or more arms (104) (say, four +four as shown in FIG. 4A) extend radially (90 degrees apart) from both ends of each of the two output drive rotors (102) (making panels effectively 45 degrees apart).

Furthermore, the one or more arms (104) are connected with the respective blade panel assemblies (108). This embodiment differs from the vertical-axis arrangement as herein, two parallel arms (104) mount the blade panel assembly (108) instead of one arm structure in vertical axis design (there also similar arm structure is usable). Again, each blade panel has the auxiliary rotary shaft (1086) which can be rotated using the primary control arrangements (106) and also the one or more sub-blade panels (1086), pivotable using secondary control arrangements (110). So, the design of the horizontal axis drag cum lift based wind turbine system (100) may look like two wind turbines arranged parallelly (there is an offset of 45 degrees shown between the two sides, or if required up to)±180°) on either side of the output arrangement (114).

As can be seen that the output arrangement (114) is placed on housing (box-shaped as shown in FIG. 4A) from where two MCUs (112) are connected at the sides. Similar to the vertical axis arrangement, the box shaped housing is connected to the gear-assembly that is used to rotate the whole wind turbine arrangement as per the wind direction. For example: at present the wind direction shown to be perpendicular to the top blade panel assemblies (108) but if the wind direction becomes axial with respect to one or more output drive rotors (102), then the whole wind turbine arrangement can be rotated 90 degrees such that the wind direction remains perpendicular to the top blade panel assemblies (108) always.

Figure 4B:
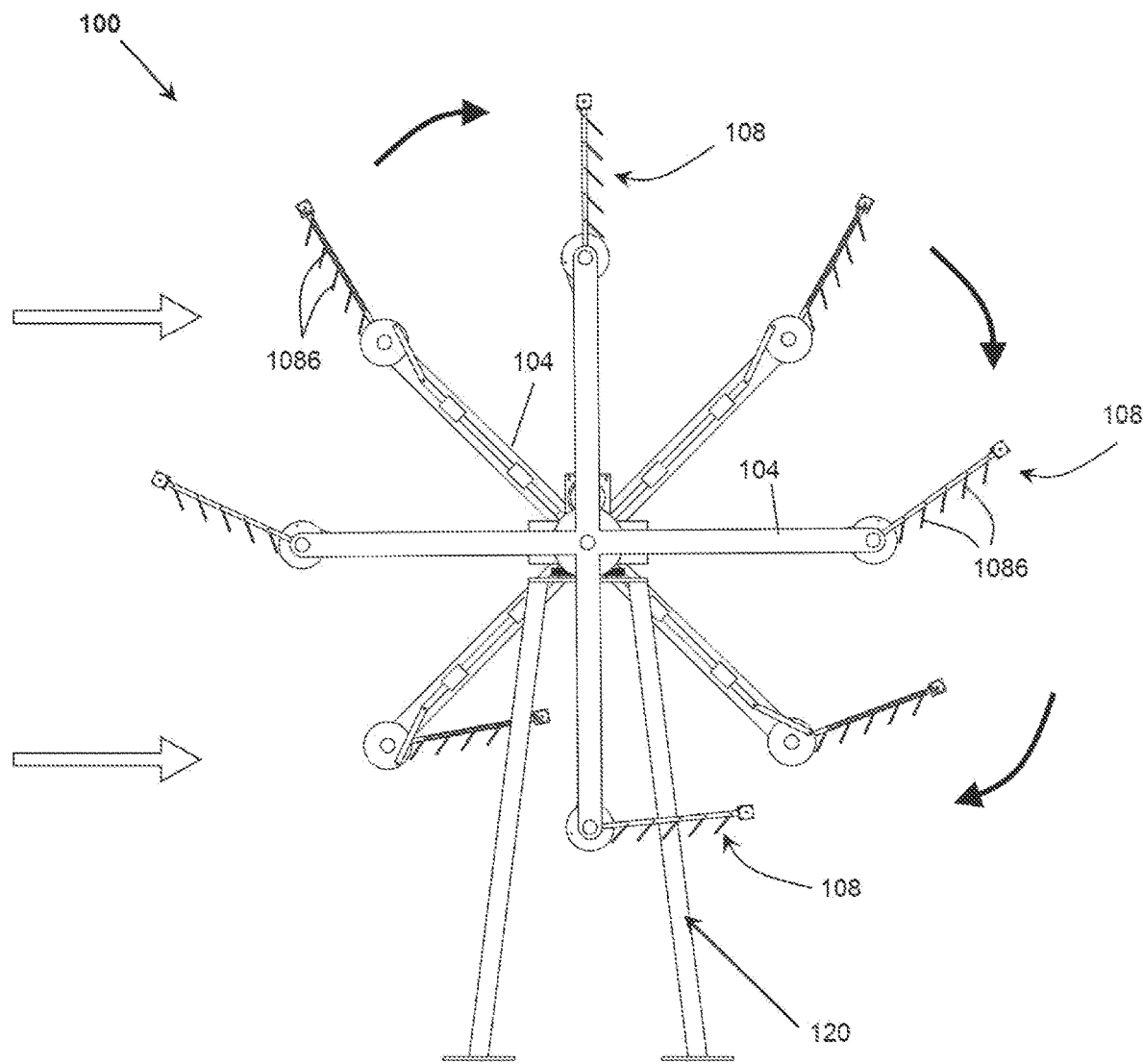
FIG. 4B illustrates a side view of the drag cum lift based wind turbine system of FIG. 4A, in accordance with an embodiment of the present invention.

The method of operation also follows same steps as that for the vertical axis system (100). As shown in FIG. 4B, it can be seen that the wind is flowing from left to right and the desired direction of rotation of the one or more output drive rotors (102) is clockwise. Again, the MCU (112) & the processing module dynamically determine the wind direction, the wind speed, the speed of rotation of the one or more output drive rotors (102), the individual angular position of the one or more arms with respect to a maximum thrust point and the force on the each mounting arrangement (1082) using the one or more sensors. So, to maximise the forward drag and the lift, the wind blade assemblies in the upper half (as seen in FIG. 4B) are oriented in a manner so as to offer maximum possible area and optimum incidence (attack) angle up to 90 degrees.

For example: the top most blade panel assembly (108) is kept perpendicular to the wind direction to offer maximum area to produce forward drag and panel movement with the wind and the lower most blade which is moving against the wind is kept parallel to wind direction to offer least area for wind to strike and minimise the reverse drag. Similarly, all the one or more blade panel assemblies (108) are configured to attain predefined orientation at specific positions during rotation to optimise (increase or decrease) the attack angle and increase the forward drag and/or lift force and reduce a reverse drag during part rotation against the wind, based on predetermined rotational position for each blade panel assembly (108).

Furthermore, just like the vertical axis system (100), if the wind speed increases, the opening of the one or more sub blade panels is adjusted using the one or more secondary control arrangements (110) to reduce forward thrust by reducing effective area of blade in contact with the wind, regulate as well as smoothen torque during gusty wind and protect the system (100) against speeds exceeding design limits. This ensures reliable and optimum full capacity output without interruptions while preventing any damage to the system (100).

It will be appreciated by a skilled addressee that the above embodiment may easily work with one output drive rotors (102) and four arms on one side of the output arrangement (114). But double arrangement has just been shown to prove how multiple output drive rotors (102) and turbines can be combined to form a single system (100). Similarly, many such arrangements with more numbers of output drive rotors (102) and series/parallel connection and reduced or increased arms on each side are possible without departing from the scope of the present invention.

One benefit of the embodiment shown in FIGS. 4A & 4B is that both set of components on either output drive rotors (102) can be configured independently or to complement each other while providing physical balancing to the entire structure. For simplicity the drawing appears to show the two sets on a single rotor.

Irrespective of the implementation, whether, vertical axis, horizontal axis or at an angle in-between, the two novel and inventive features of the present invention make it possible to cover for each other, in case one malfunctions. So, the following features illustrate flexibility and troubleshooting capabilities of the present invention, without disrupting its operation:

For example: In another implementation the pivotable action of the one or more sub-blade panels (1086) allows the present invention to work without dynamic rotation mechanism of MCU (212) controlling each of the blade panel assemblies (108). There may be a scenario when rotation of the blade panel on auxiliary rotary shaft (1086) is not working or there is a problem in rotary actuator (1066) in any or all of the blade panel assemblies (108). Then in that case any or all of the faulty blade panel assembly (108) or assemblies may be kept at a straight position protruding out in series with the respective arm structure (104). In such an implementation, the auxiliary control mechanism closes the sub blade panels during movement with wind generating maximum drag and opens all the sub blades, on all the panels during rotation against the wind to maximise the forward drag force and reduce reverse drag force. This can be done if the rotation mechanism of any one or two or all the blade panel assemblies (108) is not working.

Similarly, in another implementation there may be a case where there are unfavourable weather conditions with high speed winds exceeding optimum design limits of the system (100) and the pivotable action of the sub-blade panels (1086) isn't working. So, in that case, to prevent any damage to the system (100) without interruption of energy generation, the system (100) configures the blade panel assemblies (108) to dynamically rotate them and orient them at positions with least angle of attack required to keep rotating in the desired direction. In such a scenario, all the blade panel assemblies (108) may be oriented in a position substantially parallel to the direction of wind. The term "substantially" is used herein to indicate that there would be a slight angle in order to produce forward drag to keep the turbine and system (100) in operation. Additionally, it should be noted that this can be done easily if the primary control arrangements (106) are servo motor or stepper motor or any other motors that can dynamically rotate the auxiliary rotary shaft (1084). It can also be done if the pivotable one or more sub-blade panels (1086) of any one, two or all the blade assemblies are not working or not being used. This implementation may be of help when the present invention is used with normal blade panels (without pivotable sub-blade panels (1086)).

Apart from all the Above-Mentioned Description, Following are Some Operational Differences as Compared to Prior Art:
  Wind blows tangential to main rotor rotation as compared to Axial in prior art design
  Rotor thrust is generated by drag (majority of it) as compared to lift force in prior art design
  Drag force and lift force are additive in direction of rotation as compared to drag being at right angle in the prior art design
  Area swept by blades is much smaller for the same output as compared to prior art design
  Ratio of total thrust on tower to output is much better in invented process.
  Blade panel assembly is made of many sub blade panels as compared to single blade in prior art design.
  Each Blade panel assembly's absolute angle may change up to 270 degree or more in each rotation even with constant wind velocity as compared to pitch change for all blades to adjust to wind velocity in prior art design.
  Wind blade panel fabrication, installation and transport is easy as compared to prior art design.
  Any one or both of the inventive primary control and secondary control arrangements are capable of making invention work and achieving higher output.

The present invention also offers a number of advantages over prior art:
  1. Super High energy output per square meter of swept area 2. Light weight turbine design
3. On site fabrication and assembly readily possible
4. Employ parts of easily manageable dimensions even for super high power, large turbines.
5. Material transportation to difficult site location easy with smaller parts
6. Maintenance does not need super special infrastructure
7. Effective energy generation starts at lower wind speeds (even less than 5 km/h)
8. Can with stand and generate energy, even from over 200 km/h wind speeds without any damage to the system or interruptions in energy generation.
9. Built in protection against cyclonic wind speeds without generation shut down
10. No need of safety brake mechanism
11. Rotational energy gets transferred to ground easily in vertical rotor design
12. Energy harvesting can be multipurpose in vertical rotor design.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different set of modules, server, by the cloud computing platform, or a combination thereof. It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying analog/digital data steams along a local network or a publicly accessible network such as the LAN, WAN and Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and the appended claims.

I claim:

1. A drag cum lift based wind turbine system having adjustable blades, the system comprising:
one or more output drive rotors arranged on a base structure, each output rotor being connected with one or more arms using one or more primary control arrangements;
characterized in that
one or more blade panel assemblies rotatably mounted with the one or more respective arms, each blade panel assembly comprising:
an auxiliary rotary shaft rotatably mounted on each of the one or more arms;
a mounting arrangement connected with the auxiliary rotary shaft controlled by the one or more primary control arrangements, each blade panel mounting arrangement, housing one or more sub-blade panels pivotable at one or more pivot points of the mounting arrangement using one or more secondary control arrangements to allow the one or more sub-blade panels to rotate, thereby blocking and/or allowing wind to pass through the blade panels partially or fully;
one or more sensors to read system control parameters coupled with one or more Main Control Units (MCUs) connected with one or more processing module, the one or more primary control arrangements and the one or more secondary control arrangements; and
an output arrangement configured to convert rotational torque of the one or more output drive rotors to one or more energy forms.

2. The system as claimed in claim 1, wherein the MCU may be connected with a processing module and is configured to:
dynamically determine or control the wind direction, the wind speed, the speed of rotation of the one or more output drive rotors, the individual angular position of the one or more blade panel mounting arrangement with respect to a maximum thrust point and the force on the each blade panel mounting arrangement using the one or more sensors;
adjust an attack angle of each of the one or more blade panel assemblies individually and collectively with respect to the wind, dynamically during each rotation, using the primary control arrangements, to optimise a forward drag and/or lift force during part rotation with the wind and reduce a reverse drag during part rotation against the wind.

3. The system as claimed in claim 1, wherein the MCU is connected with the processing module and is configured to adjust opening of the one or more sub blade panels using the one or more secondary control arrangements to reduce reverse drag, regulate as well as smoothen torque during gusty winds and protect the system against wind exceeding predetermined speeds, ensuring reliable and optimum capacity output without interruptions while preventing any damage to the system.

4. The system as claimed in claim 1, wherein the one or more output drive rotors may be arranged horizontally, vertically or at angle there between on the base structure in a series or parallel arrangement.

5. The system as claimed in claim 1, wherein the one or more arms extend radially or tangentially from any or either ends or a section between the either ends of each of the one or more output drive rotors or a combination thereof.

6. The system as claimed in claim 1, wherein the one or more sub-blade panels are configured to open vertically or horizontally or at an angle, within or outside of respective mounting arrangement of the one or more blade panel assemblies.

7. The system as claimed in claim 1, wherein the one or more sub-blade panels are made of a material selected from a metal, non-metal, alloy, polymer, fibre, glass, ceramic, wood or a combination thereof.

8. The system as claimed in claim 1, wherein the one or more primary control arrangements and the secondary control arrangements are selected from one or more of cam & follower arrangements, servo motors, belt & pulley arrangements, chain & sprocket mechanism, gearing arrangements, linear & rotary actuator, lever mechanisms, centrifuge, hydraulics, pneumatic control, numerical control, stepper motors, electromagnetic motors, electromagnets, screw actuators, groove reader, digital and analog controls or a combination thereof.

9. The system as claimed in claim 1, wherein the one or more sensors include direction sensor, speed sensor, accelerometer, gyro sensor, magnetometer, orientation sensor, groove reader, protrusion reader, optical reader, pressure sensor, radiation sensor, punched disc reader, magnetic sensor, hall effect sensors, gravity switch, Tilt sensor, encoder, position sensor, tachometer, motion sensor or a combination thereof.

10. A blade panel assembly for a wind turbine system, the blade panel assembly comprising:
- an auxiliary rotary shaft rotatably mounted on the one or more rotating arms of the wind turbine system;
- characterized in that
- a mounting arrangement connected with the auxiliary rotary shaft via the one or more control arrangements, the mounting arrangement housing one or more sub-blade panels pivotable at one or more pivot points on the mounting arrangement, using one or more control arrangements to allow the one or more sub-blade panels to rotate to open and/or close, thereby blocking and/or allowing wind to pass through the blade panels partially or fully; and
- a Main Control Unit (MCU) connected with a processing module, the one or more control arrangements and having access to information, selected from one or more sensors, external connected sources, feedback mechanisms, controllers, Programmable devices and combination thereof;
- wherein the MCU is configured to adjust opening of the one or more sub blade panels using the one or more control arrangements to maximise forward torque, reduce reverse drag, regulate as well as smoothen torque during gusty winds and protect the system against wind exceeding predetermined speeds, ensuring reliable and optimum capacity output without interruptions while preventing any damage to the system.

* * * * *

UNITED STATES PATENT AND TRADEMARK OFFICE
CERTIFICATE OF CORRECTION

| | |
|---|---|
| PATENT NO. | : 11,846,269 B2 |
| APPLICATION NO. | : 17/795146 |
| DATED | : December 19, 2023 |
| INVENTOR(S) | : Rakesh Aggarwal |

It is certified that error appears in the above-identified patent and that said Letters Patent is hereby corrected as shown below:

On the Title Page

Item (30) Please add Foreign Application Priority Data:
-- January 25, 2020 (IN) 202011003425 --

Signed and Sealed this
Twenty-seventh Day of February, 2024

Katherine Kelly Vidal
*Director of the United States Patent and Trademark Office*